Nov. 3, 1953   F. A. BROWN   2,657,469
PORTABLE GEAR TOOTH CHECKING INSTRUMENT
Filed Dec. 30, 1949

Inventor:
Francis A. Brown,
by Ernest C. Britton
His Attorney.

Patented Nov. 3, 1953

2,657,469

UNITED STATES PATENT OFFICE 2,657,469

PORTABLE GEAR TOOTH CHECKING INSTRUMENT

Francis A. Brown, Saugus, Mass., assignor to General Electric Company, a corporation of New York Application December 30, 1949, Serial No. 136,050

1 Claim. (Cl. 33—179.5)

This invention relates to an improved gear tooth checking device and, in particular, it refers to a portable checking instrument for large gears.

In dealing with large gears, such as those used in ship propulsion, trouble such as noise, unsatisfactory contacts, pitting and/or galling of tooth surfaces is frequently encountered. To cure these troubles, it has been frequently necessary in the past to remove the gear from its installation and transport it to a factory where equipment is available for testing the tooth surfaces of the gear. This involves tremendous expense and waste of time, since some gears of this type are as large as 13½ feet in diameter and weigh up to 35 tons. Therefore, there has long been a need for a compact portable lightweight universal gear checker which can be easily transported to very large gears and which will give exact knowledge of conditions which cause trouble.

It is an object of this invention to provide a device for accurately measuring gear tooth contours in order to correctly analyze the cause of defects such as those mentioned above, and to determine the proper method of correction for these defects.

It is a further object of this invention to provide a compact, lightweight, universal checker which can be easily transported to gear installations.

Broadly, this invention comprises an instrument which is placed directly on a gear, whether it be installed or not, and which employs a master template having a profile of a correct tooth to guide the movement of a stylus over the tooth to be measured. Any movement of the stylus relative to the path prescribed by the correct tooth profile is detected by a gauge. A defect in a tooth being checked is thus detected.

Further objects and advantages of this invention will become apparent and the invention will be better understood from the following description referring to the accompanying drawing and the features of novelty which characterize this invention will be pointed out with particularity in the claim annexed to and forming a part of this specification.

Figure 1:
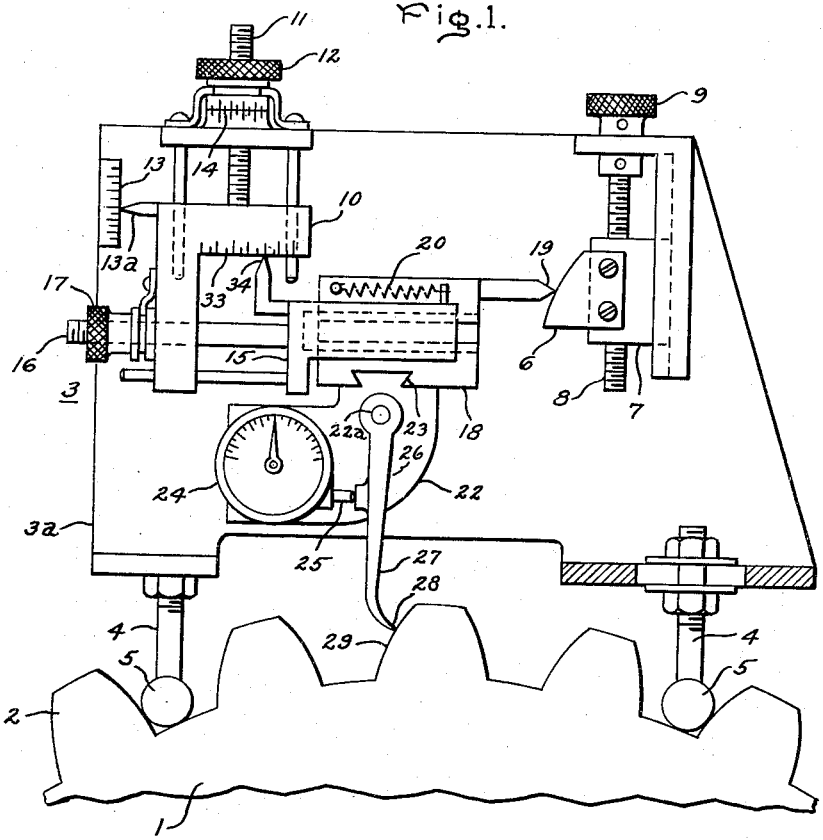
Figure 2:
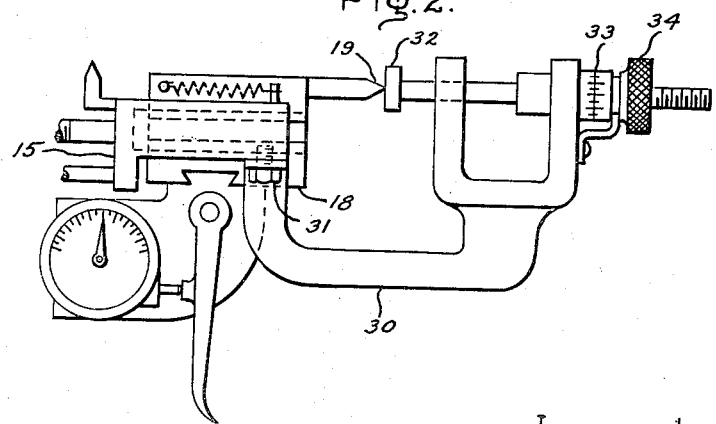

Referring to the drawing, Fig. 1 is a diagrammatic illustration of the improved gear checking instrument, while Fig. 2 is a diagrammatic illustration of a modification of a portion of the gear checking instrument.

Referring to the drawing, a gear 1 is shown having gear teeth 2. A base or support 3a for a gear checking instrument 3 is provided with adjustable legs 4 including ball feet 5 that rest in spaces between circumferentially spaced gear teeth 2. Actually, three adjustable legs are provided as a suitable support for base 3a. The third leg (not shown) is located directly behind either one of the two front legs 4 to provide a tripod-type support. With this mounting structure, a check can be made of the teeth 2 of gear 1 while the gear is in its operative position.

A template or master tooth profile 6, including a guide and support arrangement 7, is supported on base 3a by means of an adjusting screw 8 positioned by means of a knurled knob 9. The vertical position of master tooth form 6 is regulated by turning knob 9. While only one form of template 6 is shown, it is to be understood that a template is provided for each type of tooth to be checked. Templates 6 are readily interchangeable, allowing a master profile for any type of tooth to be installed on screw 8.

A vertically movable support or carriage 10 is mounted on base 3a by means of a micrometer screw 11 which is adjusted by knurled knob 12. The vertical position of carriage 10 is measured by a scale 13, pointer 13a, and by a vernier scale 14. A horizontally slidable platform 15 is supported on guide means attached to and vertically movable with the carriage 10. An adjustable screw 16, turned by knurled knob 17, regulates the horizontal displacement of platform 15 relative to carriage 10.

A follower member 18, carrying a template follower stylus 19, is guided on platform 15 and freely slidable towards and away from the template, relative to the carriage 10. A spring 20 connects template follower member 18 and platform 15, biasing member 18 to maintain stylus 19 in light, but secure, contact with the template.

A gauge stand 22 is suspended from follower 18 by a dovetail arrangement 23 which permits stand 22 to be moved transverse to member 18. A dial type micrometer indicator 24, including zero adjusting mechanism of the usual sort (not shown), and having an operating pin 25, is firmly attached to stand 22. A stylus arm 26, comprising a lever portion 27 and a stylus 28 is pivotally attached at 22a to stand 22. The stylus 28 is adapted to engage a face 29 of gear tooth 2.

A scale 33 is attached to carriage 10 and a pointer 34 attached to platform 15 indicates the horizontal displacement of platform 15 relative to the carriage.

While the invention is disclosed in the drawing in a somewhat diagrammatic fashion, it should be understood that in an actual apparatus numerous mechanical refinements could be made.

For instance, a lead screw could be substituted for the lock nut shown for adjusting the feet. This disclosure has been restricted to the diagrammatic illustration in order to simplify and to make more clearly understandable the interrelation of the elements and the operation of this instrument. It is to be further understood that while some of the elements of this invention have been described as vertically or horizontally movable, they are not to be restricted to that movement, but have been thus described in order to select reference planes to explain the movement of the parts relative to one another.

When it is desired to check a gear to determine if there is some defect in the tooth form, the instrument 3 is mounted on the gear. One leg 4 and its attached ball 5 is inserted between two teeth on the gear while the other legs, one behind the other, as has been previously described, are set between two teeth circumferentially spaced a convenient distance from the first pair of teeth. In the drawing, one of the legs is shown as being vertically adjustable, while the other is both horizontally and vertically adjustable to facilitate the mounting as described.

A master tooth form or template 6 for the type of teeth to be checked is then installed on screw 8 and adjusted to a convenient position. Knurled knobs 12 and 17 are then turned until stylus 28 is in engagement with the uppermost portion of face 29 of tooth 2, and operating pin 25 of gauge 24 is in engagement with arm 26.

After the knobs 12 and 17 have been adjusted to bring stylus 28 in engagement with the top of face 29 of tooth 2, and assuming that gear 1 is locked to prevent rotation thereof, then spring 20 has forced follower member 18 to the right to an extent that stylus 19 is engaged with template 6. Knurled knob 9 is adjusted to raise or lower the template 6 to bring a point on the master profile, corresponding to the point on tooth 2 contacted by stylus 28, in engagement with follower 19. When this has been accomplished, dial 24 is adjusted for zero reading and the instrument is then in a position to make a test check of the form of face 29 of tooth 2.

To make the test, knurled knob 12 is turned to lower the vertically movable carriage 10. As the carriage is lowered, it carries with it platform 15 and follower member 18. The contact between stylus 19 and master profile 6 forces member 18 to the left as it is lowered. Consequently, every point on follower 18 follows a path parallel to the curve on template 6.

The pivot 22a of stylus 27, since it is attached to member 18, also follows the true curve described by master tooth 6. When stylus 28 is in contact with the top of tooth 2 and then knurled knob 12 is turned to lower carriage 10, there will be no movement of stylus arm 27 relative to stand 22 if the face 29 of tooth 2 is in full agreement with template tooth 6. If there is any deviation in the shape of tooth 2 from the template or master tooth 6, however, there will be pivotal movement of arm 27 about the pivot 22a. This movement is indicated by gauge 24 and a reading of scale 13 and a micrometer scale 14 gives the exact position of this defect.

Once gear checking instrument 3 is set up for any one gear, then by moving ball feet 5 to successive spaces between teeth and by manipulating knob 12, all the corresponding faces of teeth 2 can be compared with master tooth 6. When it is desired to check the opposite face of each tooth 2, the instrument is turned around and readings similar to those described are again taken.

It is obvious that with this instrument, which is light and portable, a check can be made of the two faces of any gear tooth, so long as a master tooth form is available that agrees with the type tooth that is to be checked.

A modification of this invention is shown in Fig. 2 that adapts the instrument to make a check for errors in the tooth shapes of gears even though a template is not available. Specifically, an arm 30 is removably secured by bolts 31 to horizontally movable platform 15 in a manner that permits free movement of follower carriage 18.

Arm 30 carries an axially movable plate 32 which is adjustable by a micrometer structure 33 that includes an adjusting knob 34. Plate 32 is adapted to engage follower 19 in a manner that permits movement of both plate 32 and follower 19 without relative movement between them.

With this structure, plate 32 can be made to follow the true curve of a gear tooth. Specifically, plate 32 is adjusted axially and set by micrometer 33 while vertically movable support 10 is moved and set by micrometer 14. A combination of these two micrometer adjustments permits positioning of plate 32 to describe a true gear tooth curve, as specified by tables or charts, etc.

When the instrument is set up with the modification shown in Fig. 2 supplanting the template 6 shown in Fig. 1, stylus 28 follows the preselected curve set by micrometers 14 and 33. Consequently, if any deviation from the preselected curve exists in the tooth being checked, the deviation is noted in the gauge 24.

While the tooth check requires additional care and settings when the modification shown in Fig. 2 is used, the important feature to note is that the modification provides a method of checking a gear when the true template used in the preferred embodiment of Fig. 1 is not available.

Modifications of this invention will occur to those skilled in the art and it is desired to be understood, therefore, that this invention is not to be limited to the particular arrangement disclosed, but that the appended claim is meant to cover all modifications which are within the spirit and scope of this invention.

What I claim as new and desire to secure by Letters Patent of the United States is:

An instrument for checking gear teeth and the like comprising a base, means for supporting said base including adjustable foot portions adapted to seat between teeth at circumferentially spaced locations on a gear to be checked, a template having a master profile for the tooth to be checked, means securing the template to the base with the profile thereof substantially parallel to the tooth profile to be checked, a template follower member, a carriage with guide means supporting the template follower member for linear sliding movement towards and away from the profile of the template relative to the carriage, micrometer screw means carried on the base and connected to move said carriage towards and from the gear teeth in a line parallel to the plane of the profile of the template, whereby said template follower member traces a path parallel to the template profile, a lever member pivotally connected to the follower member and having a stylus adapted to contact the profile of the gear tooth being checked, and micrometer indicator means for detecting pivotal movement of said lever relative to the follower member whereby the profile of the gear tooth is compared with the master profile of the template.

FRANCIS A. BROWN.

References Cited in the file of this patent

UNITED STATES PATENTS

| Number | Name | Date |
|---|---|---|
| Re. 22,953 | Praeg | Dec. 23, 1947 |
| 1,652,435 | Goodrich | Dec. 13, 1927 |
| 1,928,373 | Flatter | Sept. 26, 1933 |
| 1,966,618 | Egorenkov | July 17, 1934 |
| 2,048,154 | Abbott | July 21, 1936 |
| 2,336,845 | Christensen | Dec. 14, 1943 |
| 2,433,421 | Bowness | Dec. 30, 1947 |

FOREIGN PATENTS

| Number | Country | Date |
|---|---|---|
| 344,334 | Germany | Nov. 19, 1921 |
| 480,868 | England | Mar. 2, 1938 |
| 584,737 | England | Jan. 22, 1947 |